United States Patent [19]

Capper

[11] Patent Number: 4,483,203

[45] Date of Patent: Nov. 20, 1984

[54] MULTI-AXIS FORCE TRANSDUCER

[75] Inventor: Harry M. Capper, Harrisburg, Pa.

[73] Assignee: AMP Incorporated, Harrisburg, Pa.

[21] Appl. No.: 500,495

[22] Filed: Jun. 2, 1983

[51] Int. Cl.³ .............................................. G01L 5/16
[52] U.S. Cl. ............................... 73/862.04; 73/862.01
[58] Field of Search ........... 73/862.04, 862.01, 862.65, 73/862.05, 862.06

[56] References Cited

U.S. PATENT DOCUMENTS

| | | | |
|---|---|---|---|
| 2,814,946 | 12/1957 | Harris | 73/862.65 |
| 2,859,613 | 11/1958 | Green | 73/862.65 |
| 3,988,934 | 11/1976 | Kamphoefner et al. | 73/862.04 |
| 4,276,772 | 7/1981 | Ferguson | 73/862.62 |
| 4,419,902 | 12/1983 | Somal | 73/862.65 |

FOREIGN PATENT DOCUMENTS 1756097  3/1970  Fed. Rep. of Germany ... 73/862.04

Primary Examiner—Anthony V. Ciarlante
Attorney, Agent, or Firm—Donald M. Boles

[57] ABSTRACT

A multi-axis force transducer capable of producing discrete output signals for forces and moments in each of three orthogonal directions is taught. Briefly stated, a base having three U shaped slots nested within each other are disposed inside a base or body. A series of holes through the base are placed parallel to the leg of the U-shaped slots with strain gages positioned therein thereby providing a plurality of beams. The body is relatively rigidly supported so as to allow free movement of the beams with an additional beam attached thereto to provide measurement capability for moments about one of the orthogonal axis. The strain gages are electrically interconnected so as to provide discrete output signals for forces and for moments in each of three orthogonal directions.

17 Claims, 14 Drawing Figures

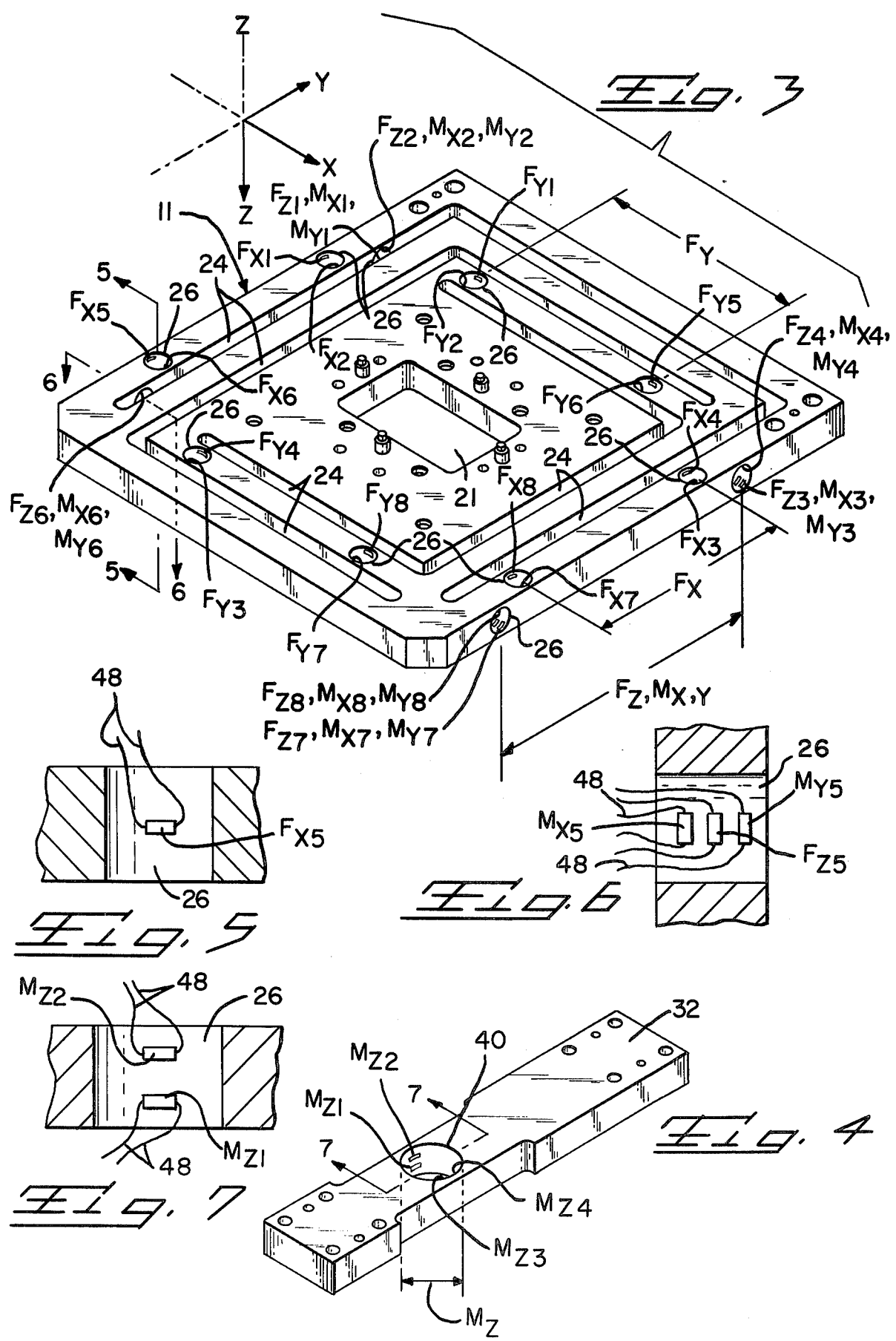

$F_X$ $F_Y$ $F_Z$ $M_X$ $M_Y$ $M_Z$

MULTI-AXIS FORCE TRANSDUCER

BACKGROUND OF THE INVENTION

This invention relates, generally, to a multiaxis force transducer and more particularly to a force transducer which provides electrical output signals which are proportional to forces and moments along three orthogonal axis.

As a result of present day manufacturing considerations such as miniaturization, minimization of materials and optimizing the usage of materials, accurate testing and evaluation becomes an increasingly significant factor. This is particularly present in industries such as the electrical connector field wherein contact forces are critical and must be accurately examined. This problem of measuring forces and also moments in a discrete manner therefore becomes more and more important. Heretofore however, devices for measuring such forces required reorientation of the device to be measured or the transducer for performing the measurement for each directional force or moment. Further, devices which attempt to measure forces and or moments in more than one direction simultaneously generally require computer processing so as to spearate force measurements into proper directional components. A description of some generally utilized force transducers or detectors may be found in the U.S. Pat. Nos. 4,258,565 "FORCE DETECTOR" issued Mar. 31, 1981, to Sawayama et al; 4,223,443 "STRAIN PICK-UP FOR TESTING OF MATERIALS" issued Sept. 23, 1980 to Bachmann et al; 4,114,429 "METHOD OF AN APPARATUS FOR SENSING STRAIN IN STRAINED MEMBERS" issued Sept. 19, 1978, to Clark; 4,055,078 "STRAIN TRANSDUCER" issued Oct. 25, 1977 to D'Antonio et al; 3,559,467 "STRAIN MEASURING DEVICE" issued Feb. 2, 1971 to Gurol et al; 3,470,700 "SINGLE BEAM FORCE TRANSDUCER WITH INTEGRAL MOUNTING ISOLATION" issued Sept. 30, 1969 to Weisbord; 3,341,795 "FORCE TRANSDUCER" issued Sept. 12, 1967 to Eisele and 3,263,199 "BENDING-STRAIN TRANSDUCER" issued July 26, 1966 to Zandman.

It is desirable to have a device which is sensitive to forces and moments having outputs which are independent from each other with respect to their orthogonal axes. It is also desirable to have such a device which is relatively simple as well as inexpensive to manufacture and having a minimum number of components. It is also advantageous to have a device which does not require computer analyzation of output data to obtain force values, but instead uses relatively inexpensive strain gage conditioners and elements.

Accordingly, the present invention teaches and as an object of the present invention a multi-axis force transducer, comprising a body having four sides, a top and a bottom portion, a plurality of U-shaped apertures disposed in the body wherein the U-shaped apertures are disposed with respect to each other so as to be nested within each other thereby defining a beam portion which is adjacent to the legs of the U-shaped apertures, a plurality of strain gage mounting apertures disposed in the beam portion and at least one strain gage disposed inside each strain gage mounting aperture so as to measure tension or compression experienced by the associated beam in one axis only.

BRIEF DESCRIPTION OF THE DRAWINGS

Reference is now made to the description of the preferred embodiment illustrated in the accompanying drawings in which:

FIG. 3 is an isometric drawing of a portion of the transducer of the present invention illustrating placement of the different strain gages;

FIG. 4 is an isometric view of a portion of the transducer shown in FIGS. 1 and 2;

FIGS. 5, 6 and 7 are cross sectional views taken through FIGS. 3 and 4 showing placement of strain gages;

DESCRIPTION OF THE PREFERRED EMBODIMENT

Figure 1:
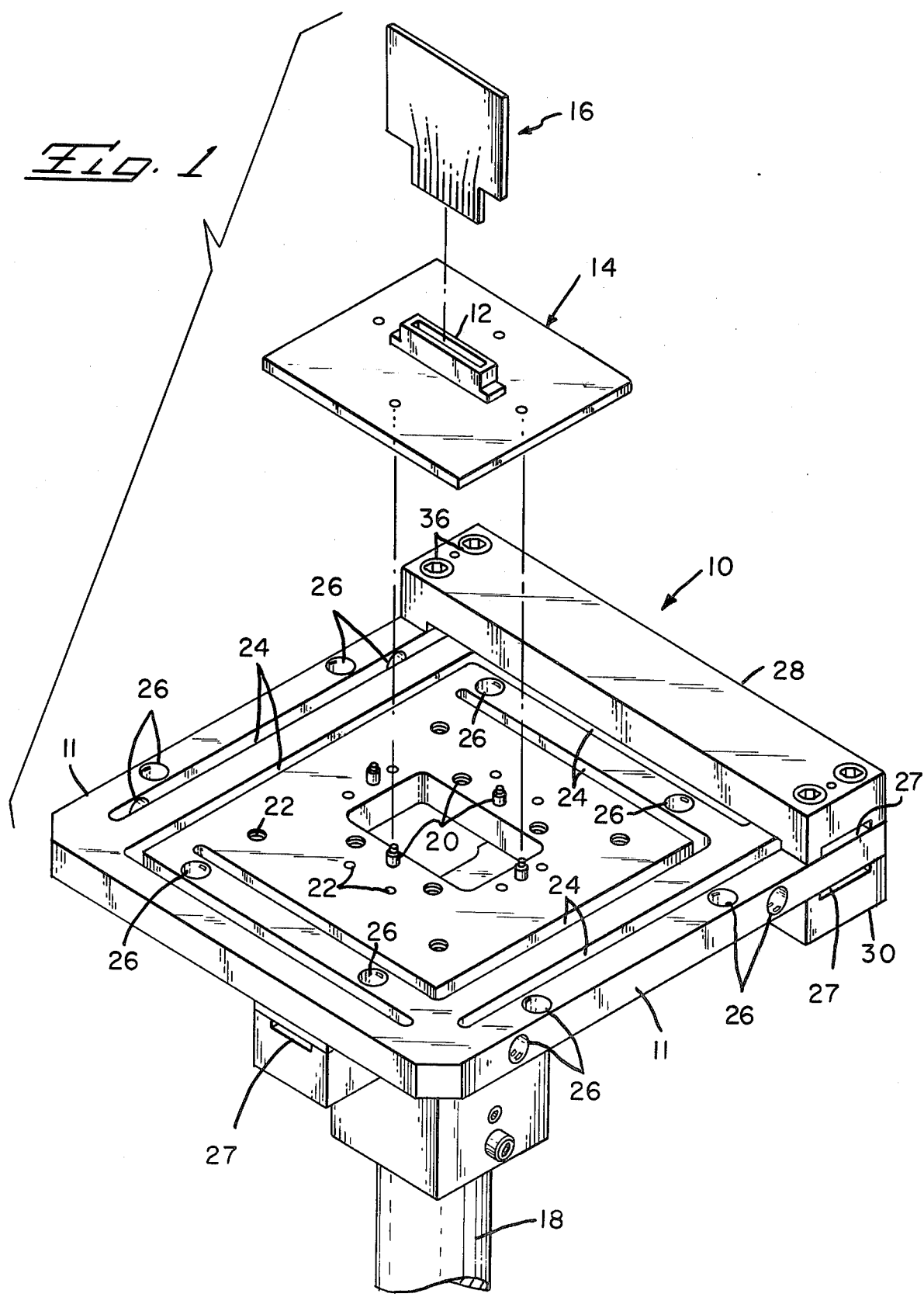
FIG. 1 is an isometric view of the present invention.

Referring now to FIG. 1, there is shown an isometric view of the present invention. Here can be seen how the multi-axis force transducer shown generally at 10 is comprised of a transducer body 11 which is comprised of aluminum. Shown also is a card edge connector disposed on a connector holder which is ready for insertion of a printed circuit board 16. The connector, holder and boards 12, 14 and 16 are examples of how the mating forces of the card edge connector 12 may be measured and are only exemplary. The force transducer 10 is disposed on a test stand 18 which positions as well as rigidly holds the force transducer 10 in a stable and upright position. However, it is to be understood that different types of test stands such as those encountered in automatic test equipment may be utilized. Further, the transducer 10 may be configured in other positions. Disposed in the center of the body 11 is connector mounting hardware 20 which may be changed and or modified using different spaced holes 22 disposed therein, thereby accomodating different test configurations. Disposed in the body 11 are axis slots 24 which are generally U-shaped and in a nested configuration. The positioning of the axis slots 24 defines the different orthogonal axes orientations which may be measured as shown more fully in FIG. 3. Also disposed in the body 11 are strain gage mounting apertures 26. Recesses 27 are disposed in the upper mounting bracket 28 and the lower mounting bracket 30 and provide a consistent support for the body 11 without restricting movement within the transducer 10.

Figure 2:
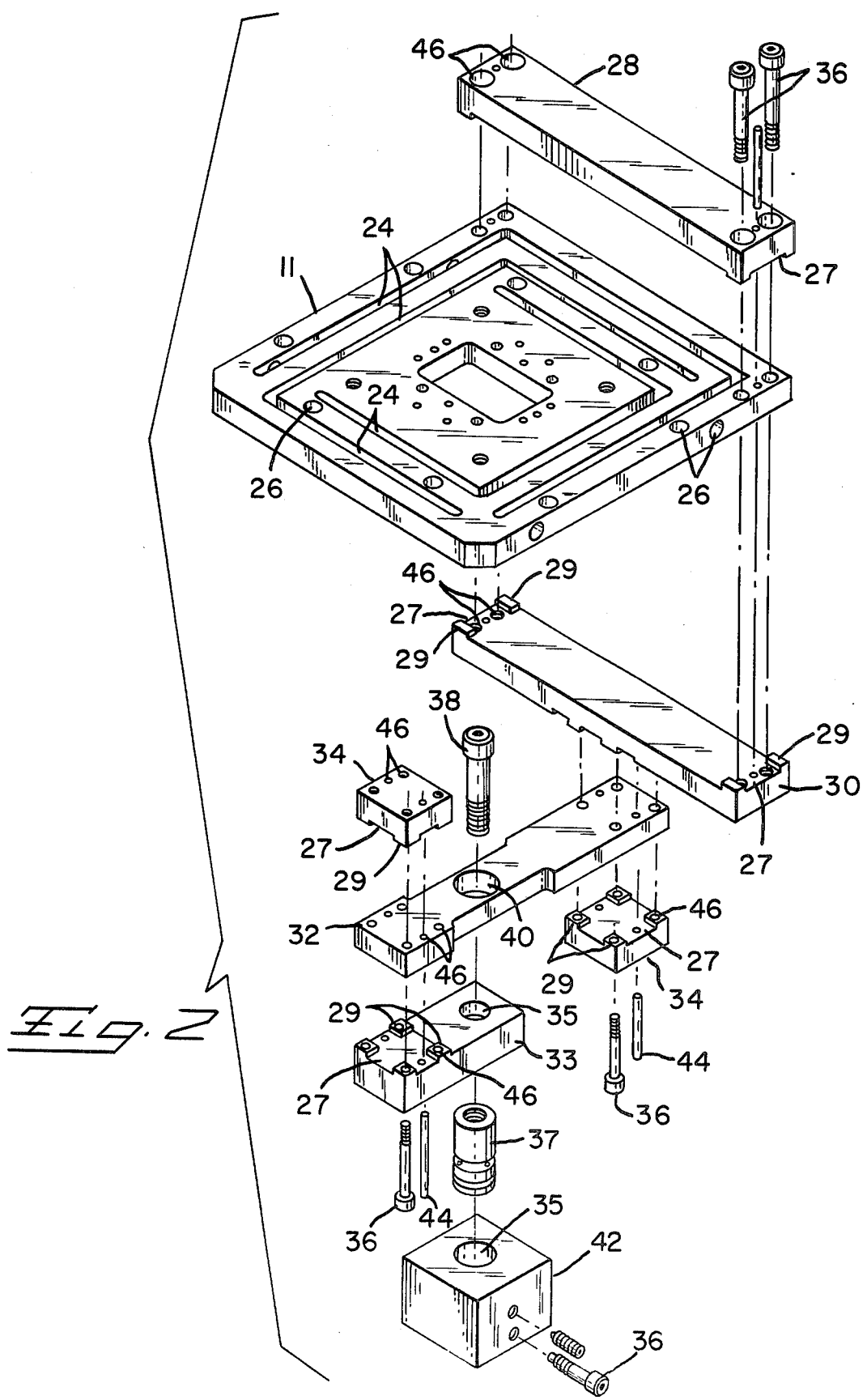
FIG. 2 is an exploded isometric view of the force transducer of FIG. 1.

Referring now to FIG. 2 there is shown an exploded isometric view of the multi-axis force transducer 10 of the present invention. Here it can be seen how standoffs or legs 29 are disposed on a plurality of the components thereby helping to form recesses 27. Shown also is a Z azis moment member 32 which is utilized to measure moments about the Z axis as described more fully in FIG. 3. Spacers 34 are utilized to rigidly hold the Z axis moment member 32 as well as providing a means for a test stand 18 (not shown). Transducer mounting hardward 26 is shown and is utilized to fasten the various components of the transducer 10 together. Disposed in the lower spacer 33 is an aperture 35 which cooperates with the mounting bolt 38 and the transducer pivoting member 37 to allow the transducer 10 to pivot about the mounting block 42. Disposed in the Z axis moment member 32 is a Z axis moment strain gage aperture 40. Locating pins 44 are utilized in conjunction with transducer mounting hardward 36 to accurately and securely maintain the spacer 34 and the lower spacer 33 in proper alignment with the Z axis moment member 32.

Referring now to FIGS. 3 and 4 there is shown an isometric view of a portion of the transducer 10 illustrating the placement and orientation of strain gages. Also shown is the orientation of the 3 orthogonal axes although it is to be understood that the X, Y and Z designations may be interchanged. Also shown are the strain gage mounting apertures 26 together with the appropriate strain gages such that the orientation and placement of the apertures 26 facilitate measurement of forces and moments in the appropriate direction. This is due to the use of the U-shaped axis slots 24 in the body 11 thereby forming six beams consisting of three pairs of two. The beams are supported at each end but remain free from longitudinal or latitudinal restraints depending upon the axis which they will be operating in. Through the use of the apertures 26, which are of a very large diameter with respect to the beam width, relatively highly strained areas are created on the interior portion of the aperture surfaces at the thinnest section of the beam. It has been found that the beam widths as defined by the distance between the associated apertures 26 has an affect upon sensitivity of the transducer 10, while shortening or lengthening the distance between apertures 26 also affects the relative flexibility or stiffness of the entire device. These considerations therefore facilitate placement of the strain gages as shown. Through proper orientation of the strain gages which, in the preferred embodiment of the present invention are of a resistive type, forces as well as moments with respect to each of the three orthogonal axes may be measured. Additionally through proper electrical interconnection of the strain gages (shown in FIGS. 9A through 9F) gage outputs may be averaged or discounted thereby allowing for discreet individual output signals of forces in the X, Y and Z directions ($F_x$, $F_y$, $F_z$) as well as moments about the X, Y and Z direction ($M_x$, $M_y$, $M_z$). The numbering or designations of the gages has been simplified in that gages for measuring forces in the X and Y direction on the interior or center portion of these beams are even numbered ($F_{x2}$, $F_{x4}$, $F_{x6}$, $F_{x8}$, $F_{y2}$, $F_{y4}$, $F_{y6}$, and $F_{y8}$) are even numbered. Similarly the odd numbered strain gages are located towards the exterior or outer portion of the body 11 ($F_{x1}$, $F_{x3}$, $F_{x5}$, $F_{x7}$, $F_{y1}$, $F_{y3}$, $F_{y5}$ and $F_{y7}$). Gages measuring forces in the Z direction and moments about the X and Y direction are also designated such that the even numbered ones are in the top or upper portion of the body 11 ($F_{z1}$, $F_{z3}$, $F_{z5}$, $F_{z7}$, $M_{x1}$, $M_{x3}$, $M_{x5}$, $M_{x7}$, $M_{y1}$, $M_{y3}$, $M_{y5}$ and $M_{y7}$). Similarly for moments about the Z axis strain gages $M_{z1}$, $M_{z2}$, $M_{z3}$ and $M_{z4}$ which are located in the Z axis moment member 32 are numbered accordingly.

Referring now to FIGS. 5, 6 and 7 there is shown partial cross-section of views taken through sections 5—5, 6—6, and 7—7 of FIG. 3. Here it can be seen how the strain gages are oriented in the strain gage mounting apertures 26 and wires 48 which eminate from the strain gages. It will be noted that the gages are mounted perpendicular to the center line of the apertures 26 and as mentioned earlier are at the thinnest portions of the beam. This arrangement localizes strain area which therefore results in the transducer 10 being relatively sensitive to forces and moments while still remaining somewhat stiff. Further, this localization of the strain area maximizes the accuracy which is measured by the gages. The sensitivity and accuracy may also be increased as well as making each of the gages in its own axes sensitive equally with respect to each other by machining of beam material external to the apertures along its intended axis of symmetry.

Figure 8:
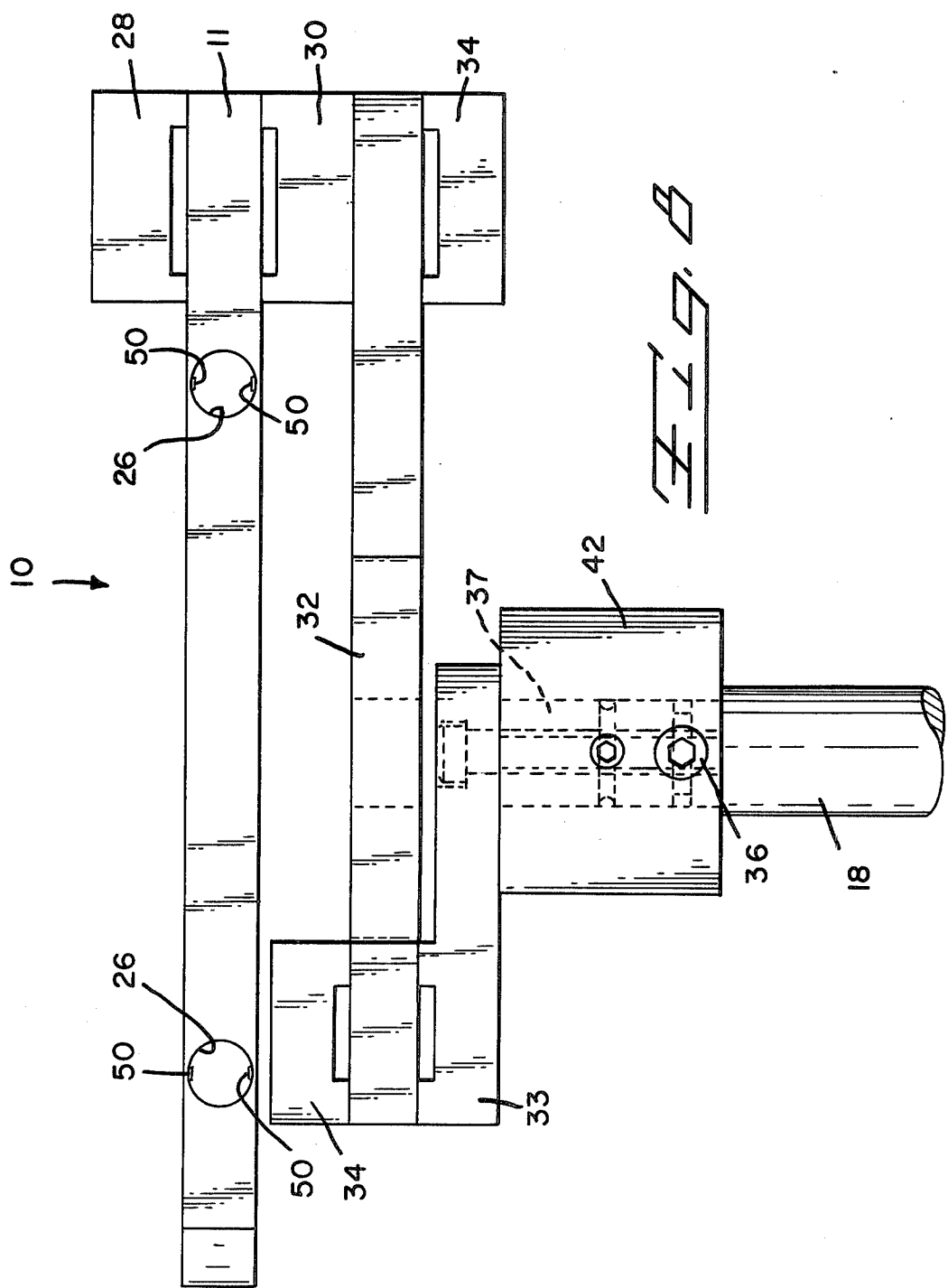
FIG. 8 is a side elevational view of the assembled force transducer of the present invention.
Figure 9A:
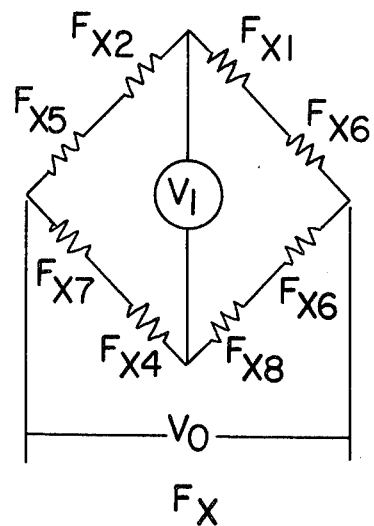
FIGS. 9A through 9F are schematic diagrams showing the electrical interconnection of the strain gages utilized with the present invention.
Figure 9B:
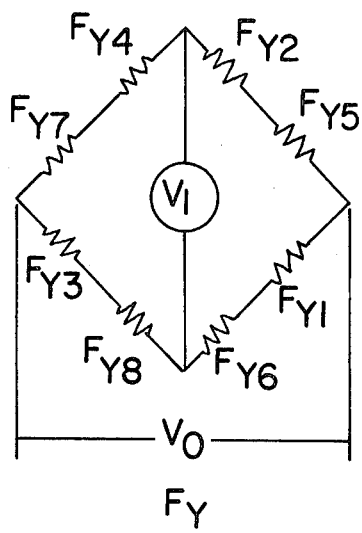
Figure 9C:
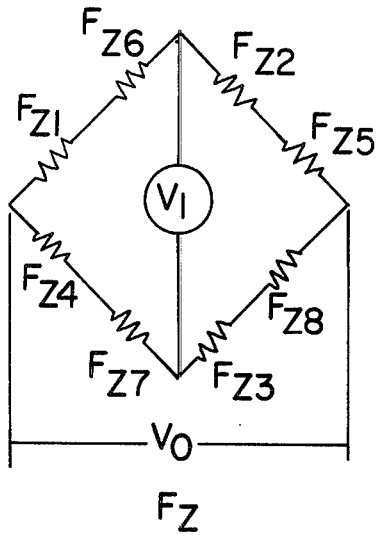
Figure 9D:
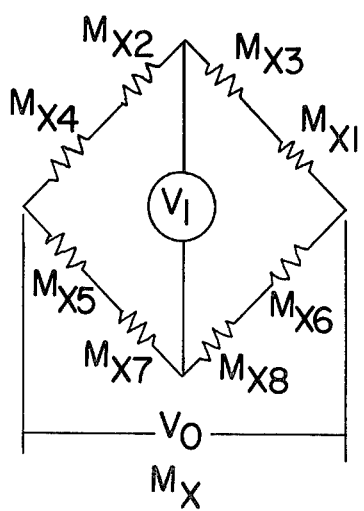
Figure 9E:
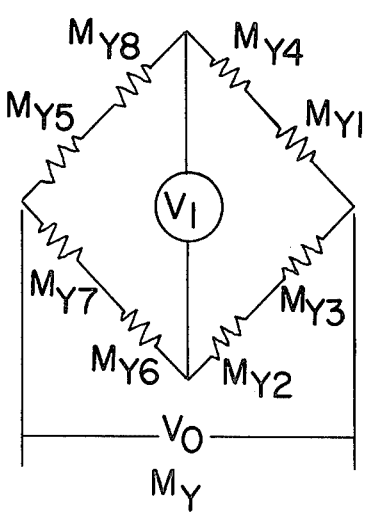
Figure 9F:
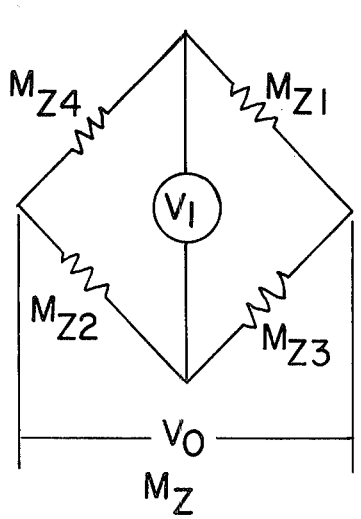

Referring now to FIG. 8 there is shown a side elevational view of the assembled transducer as shown in FIG. 1. Here it can be seen how the body 11 is supported by the brackets and members 28, 30, 33, 34, 42 and 18 as well as placement of strain gages 50.

Referring now to FIGS. 9A through 9F there is shown the wiring configurations of the various strain gages so as to obtain discrete, uniform accurate strain gage measurements in or about each of the three orthogonal axes. Here it can be seen how an input signal $V_i$ is applied to the strain gages which thereby produces an output signal $V_o$. The input signal $V_i$ in the preferred embodiment of the present invention is a sinusoidal AC signal although it is to be understood that DC or other types of signals may be utilized without departing from the spirit and scope of the present invention. Since a discrete output signal is produced for each force and/or moment in each of the orthogonal axis directions, all that need be done to produce a readily readable signal is that the output signal $V_o$ be applied to a strain gage conditioner (not shown) such as, for example, a DAYTRONICS Model 3278 manufactured by the DAYTRONICS Corporation of Miamisburg, Ohio, or other similar device. Alternatively the outputs may be connected to recording devices since the output signals $V_o$ are discrete with respect to each other. Therefore computer processing of the signals is not necessary.

OPERATION OF THE FORCE TRANSDUCER

Referring now to FIGS. 3 and 4 the generation of an out signal coincident with the application of a force will be discussed below. For simplicity purposes a singular force in the X direction will be shown. It is to be understood however that operation of the transducer for the measurement of forces and moments in the three orthogonal directions is essentially identical thereto. Therefore assuming that a force has been applied in the positive X direction only strain gages $F_{x1}$ through $F_{x8}$ as marked by the $F_x$ center lines will act in the following manner. It is to be understood however that although for simplicity purposes one may consider this force in the X direction to be applied at any point near or around the center aperture 21 disposed in the middle of the body 11 this force may be applied at any point on the body 11 without effecting the accuracy of the force measurement. However, any force such as this in the X direction which is not placed precisely at the center of the center aperture 21 and which is not along the X axis will produce a moment about the Z axis $M_z$. However, as mentioned previously the moment measurement $M_z$ is produced discretely from the $F_x$ output signal and may therefore be taken into account or ignored as necessary.

Upon application of the force in the positive X direction (although not shown, the body 11 is held rigidly by the upper and lower mounting brackets) the portion of the body 11 adjacent to strain gage $F_{x1}$ will experience tension while the portion of the base 11 adjacent to strain gage $F_{x2}$ will experience compression. Therefore strain gages $F_{z1}$ and $F_{x2}$ will measure tension and compression respectively and therefore decrease or increase their resistance. Similarly strain gages $F_{x4}$ and $F_{x3}$ will experience tension and compression respectively. Strain gage $F_{x5}$ will measure compression while strain gage $F_{x6}$ will measure tension with strain gages $F_{x8}$ and $F_{x7}$ doing the same respectively. Superimposing the tension and compression designations onto 9A which is the wiring configuration for measuring forces in the X direction, $F_x$ it is readily obvious that $F_{x1}$ and $F_{x6}$ are in tension along with $F_{x4}$ and $F_{x7}$ while $F_{x2}$, $F_{x5}$, $F_{x3}$ and $F_{x8}$ are in compression. Therefore it can be readily seen that, electrically, members or gages which measure tension are in opposite legs of the wiring configuration while those measuring compression are adjacent to those legs measuring tension and opposite to each other. In the situation where a force is exerted in the negative X direction the gages which previously measured tension would now measure compression while similarly those measuring compression would now measure tension. Accordingly, the outputs of the gages are electrically added for taking force measurements. Utilizing the same principal, moment outputs or measurements may be obtained with the moment output signals obtained by taking the algebraic different of outputs from opposing beam locations.

It is to be understood that many variations of the present invention may be utilized without departing from the spirit and scope of the present invention. For example, different strain gage elements such as pisoresistive elements may be utilized. Further, the transducer may be constructed so as to measure forces or moments or any combination thereof in less than all three orthogonal directions. Additionally, it is not necessary that the axes be orthogonal with respect to each other. Further, portions of the force transducer may be eliminated such as, for example, the Z-axis moment member as well as some of the axis slots thereby allowing for measurements in less than three directions. This would therefore, for example, be the elimination of the innermost two axis slots and the strain gage mounting apertures associated therewith, thereby resulting in a force transducer which will measure forces in two directions such as X/Y so as to facilitate coefficient for friction measurements. Also, the spacing of the strain gage mounting apertures may be increased or decreased thereby effecting the relative flexibility or stiffness of the beam. Additionally, the device may be comprised or made out of materials other than aluminum such as steel, plastics or copper although it is to be understood that some materials may effect the accuracy accordingly. Further, different types of strain gage amplifiers or meters may be utilized in addition to other recording mechanisms such as strip chart recorders, X-Y plotters or the signals may be digitized for later computation or mathematical analysis. Also, different shaped bodies may be used while different means of supporting the multi-axis force transducer may be utilized.

Therefore, in addition to the above-enumerated advantages the disclosed invention produces a multi-axis force transducer which is relatively inexpensive to manufacture, simple and relatively inexpensive to utilize while providing capability for separate measurements of forces and movements in each of three orthogonal directions.

What is claimed:

1. A multi-axis force transducer, comprising:
   a body having four sides and a top and a bottom portion;
   a plurality of U-shaped apertures disposed in said body, wherein said U-shaped apertures are disposed with respect to each other so as to be nested within each other, thereby defining a beam portion adjacent to the legs of said U-shaped apertures;
   a plurality of strain gage mounting apertures disposed in said beam portions; and
   at least one strain gage disposed inside each of said strain gage mounting apertures so as to measure tension or compression experienced by the associated beam in one axis only.

2. A device according to claim 1 wherein three U-shaped apertures are disposed in said body.

3. A device according to claim 1 wherein said strain gages are disposed at the thinnest section in said beams and further being perpendicular disposed to the longitudinal axis of said strain gage mounting apertures.

4. A device according to claim 1 wherein at least two strain gages are disposed in each of said strain gage mounting apertures.

5. A device according to claim 1 wherein for each axis force or moment to be measured, two strain gage mounting apertures are disposed in each of two parallel beams so as to experience tension or compression.

6. A device according to claim 5 wherein for each axis force or moment to be measured at least two strain gages are disposed in each of said strain gage mounting apertures.

7. A device according to claim 6 wherein for each force or moment to be measured in each axis said strain gages are electrically interconnected so as to produce an output signal related to the force or moment to be measured upon the introduction of an input signal.

8. A device according to claim 7 wherein said axes are orthogonal with respect to each other.

9. A device according to claim 6 wherein said axes are orthogonal with respect to each other.

10. A device according to claim 5 wherein said axes are orthogonal to each other.

11. A device according to claim 1 wherein for each force or moment to be measured in each axis direction said strain gages are electrically interconnected so as to produce an output signal related to the force or moment to be measured upon the introduction of an input signal.

12. A device according to claim 11 wherein said axes are orthogonal with respect to each other.

13. A device according to claim 1 wherein a second body or member having four sides, a top and a bottom portion is disposed parallel to and underneath or above said top or bottom portion of said body as claimed in claim 1, said member being relatively rigidly attached at one end to one end of said body as claimed in claim 1, said member thereby forming an additional beam and having a strain gage mounting aperture disposed therethrough and further having at least one strain gage disposed inside said strain gage mounting aperture so as to measure tension or compression for forces or moments about an axis.

14. A device according to claim 12 wherein a plurality of strain gages are disposed at the thinnest section in said member and further being perpendicularly disposed to the longitudinal axis of said strain gage mounting apertures.

15. A device according to claim 13 wherein a plurality of strain gages are disposed in said strain gage mounting aperture in said member and are electrically interconnected so as to produce an output signal related to the force or moment to be measured upon the introduction of an input signal.

16. A device according to claim 1 wherein the axes are orthogonal with respect to each other.

17. A force transducer, comprising:
a body having four sides and a top and a bottom portion;
at least one U-shaped aperture disposed in said body thereby defining a beam portion adjacent to the legs of said U-shaped aperture;
at least one strain gage mounting aperture disposed in at least one beam portion; and
at least one strain gage disposed inside said strain gage mounting aperture so as to measure tension or compression experienced by the associated beam in one axis only.

* * * * *